United States Patent [19]

Blonder

[11] Patent Number: 5,128,787

[45] Date of Patent: Jul. 7, 1992

[54] LCD DISPLAY WITH MULTIFACETED BACK REFLECTOR

[75] Inventor: Greg E. Blonder, Summit, N.J.

[73] Assignee: AT&T Bell Laboratories, Murray Hill, N.J.

[21] Appl. No.: 623,476

[22] Filed: Dec. 7, 1990

[51] Int. Cl.$^5$ .......................... G02F 1/13; G02B 5/08; F21V 7/00

[52] U.S. Cl. ........................ 359/70; 359/851; 362/346

[58] Field of Search ............... 350/338, 345, 612, 613, 350/618, 621, 276 R; 362/296–297, 341, 346; 359/605, 608, 742, 866, 49, 70, 69

[56] References Cited

U.S. PATENT DOCUMENTS

| | | |
|---|---|---|
| 4,106,859 | 8/1978 | Doriguzzi et al. ................. 350/338 |
| 4,185,895 | 1/1980 | Stephens et al. .................... 359/70 |
| 4,249,801 | 2/1981 | Masubuchi .......................... 350/338 |
| 4,415,236 | 11/1983 | Perregaux ............................ 350/338 |
| 4,431,272 | 2/1984 | Yazawa et al. ..................... 350/338 |
| 4,706,173 | 11/1987 | Hamada et al. ..................... 350/345 |
| 4,991,940 | 2/1991 | Dalisa et al. ........................ 350/338 |
| 5,054,900 | 10/1991 | Simson ................................ 359/851 |

*Primary Examiner*—Scott J. Sugarman
*Assistant Examiner*—James Phan
*Attorney, Agent, or Firm*—Glen F. Books

[57] ABSTRACT

In accordance with the present invention, a transparent display, such as an LCD, is provided with back reflector having a plurality of reflecting facets angularly displaced with respect to the plane of the display cell so as to enhance contrast of the display without consumption of additional power while reducing glare. Advantageously the reflecting facets are oriented to concentrate reflection to a viewer of light above the viewer and light coming from over the viewer's shoulder. The result of such concentration is a display having backlit visual characteristics without the consumption of backlighting power. Preferred embodiments are disclosed for vertical and horizontal mounting.

10 Claims, 4 Drawing Sheets

LCD DISPLAY WITH MULTIFACETED BACK REFLECTOR

TECHNICAL FIELD

This invention relates generally to transparent display devices, and more particularly, to a transparent display device, such as a liquid crystal display, having a multifaceted back reflector to reduce power consumption, increase contrast and reduce glare. By transparent display, applicant refers to visual display devices wherein either the visual message portion of the display or the background portion is transparent or translucent. Examples of such displays are liquid crystal displays (LCDs) and ferroelectric light valves. The invention is particularly useful as a low power display screen for a portable computer or portable telephone.

BACKGROUND OF THE INVENTION

The combination of microelectronic circuits and low power liquid crystal displays has led to a wide variety of portable electronic products. These products range from electronic watches to hand-held television receivers and laptop computers. Low power consumption is a critical requirement for each of them.

Despite their considerable utility in conjunction with integrated circuits, LCD displays have a number of shortcomings. In typical LCD cells the activated portion is darkened, representing a visual message, and the unactivated portion is transparent, constituting visual background. One shortcoming of LCD displays is the relatively low contrast between the activated portion and the unactivated portion. One approach to increasing the contrast is to backlight the cell, thereby producing a sharp visual contrast between the portions of the cell darkened by activation and the light shining through the transparent regions. Unfortunately, backlighting requires power. Even in so complex an electronic structure as a portable computer, the power used in display backlighting is the major drain on the system batteries.

An alternative approach to increasing contrast is to provide a reflector on the back of the cell to enhance contrast by reflecting light through the transparent regions. As in the case of the backlighted cell, the reflected light enhances the visual contrast. This approach also has shortcomings. One difficulty is that both the cell and the reflector typically have parallel planar surfaces. As a consequence, light reflected from the back reflector and glare reflected from the front surface of the cell are reflected in the same direction. Moreover, the greater the amount of light that is reflected from the back reflector, the greater the amount of glare reflected from the front surface. A second difficulty is that the cell is usually thicker than a single pixel of the display. As a consequence, a shadow of darkened pixel cast onto the reflector can be confused with the real image.

Various efforts have been made to texture the back reflector so that reflection is essentially isotropic (sometimes referred to as "Lambertion"). But because reflection is isotropic the light reflected to the viewer is necessarily diminished, and such displays lack the visual distinctiveness of a backlit display. Accordingly there is a need for a structure to enhance the contrast of an LCD display without consuming additional power and without aggravating glare.

SUMMARY OF THE INVENTION

In accordance with the present invention, a transparent display, such as an LCD, is provided with back reflector having a plurality of reflecting facets angularly displaced with respect to the plane of the display cell. The facets are displaced to enhance contrast of the display without consumption of additional power and to reduce glare. Advantageously the reflecting facets are oriented to concentrate reflection to a viewer of light above the viewer and light coming from over the viewer's shoulder. The result of such concentration is a display having backlit visual characteristics without the consumption of backlighting power. Preferred embodiments are disclosed for mounting on equipment in vertical and horizontal positions.

BRIEF DESCRIPTION OF THE DRAWING

The advantages, nature and various additional features of the present invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
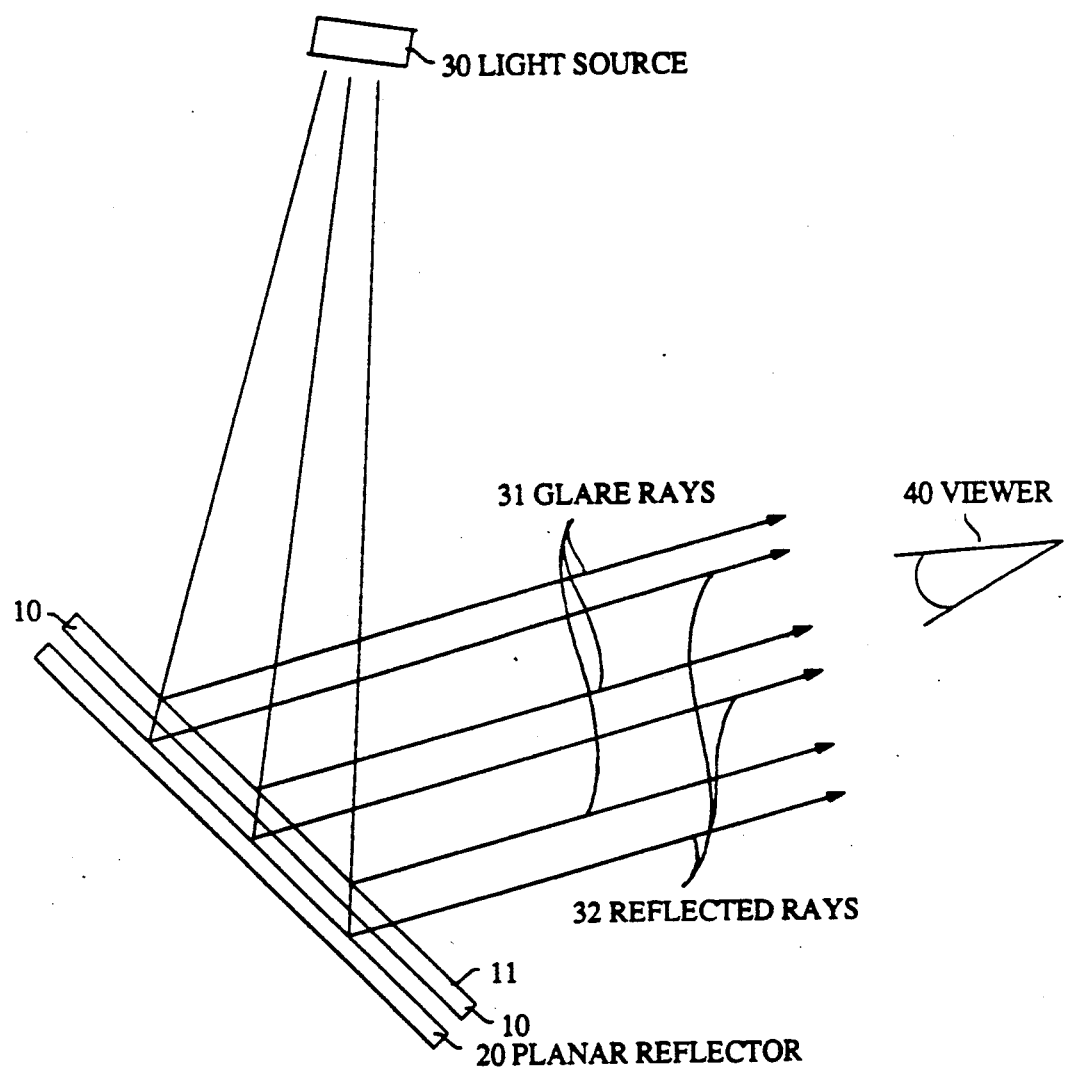
FIG. 1 is a schematic diagram of a typical transparent display having a conventional planar back reflector. The diagram is useful in illustrating the problems to which applicant's invention is directed.

Referring to the drawings, FIG. 1 illustrates a problem commonly encountered with a transparent display cell 10 using a conventional planar back reflector 20 to enhance contrast. As shown, display cell 10 has a front surface 11 substantially parallel to reflector 20. As a consequence, light from source 30 is not only reflected by reflector 20 but also is reflected by front cell surface 11 as glare rays 31. Thus a viewer 40 sees not only reflected rays 32 from reflector 20 but also glare rays 31 from surface 11. Since both sets of rays are in the same direction, the orientation of the display which maximizes the reflected rays 32 also maximizes the glare rays 31.

Figure 2:
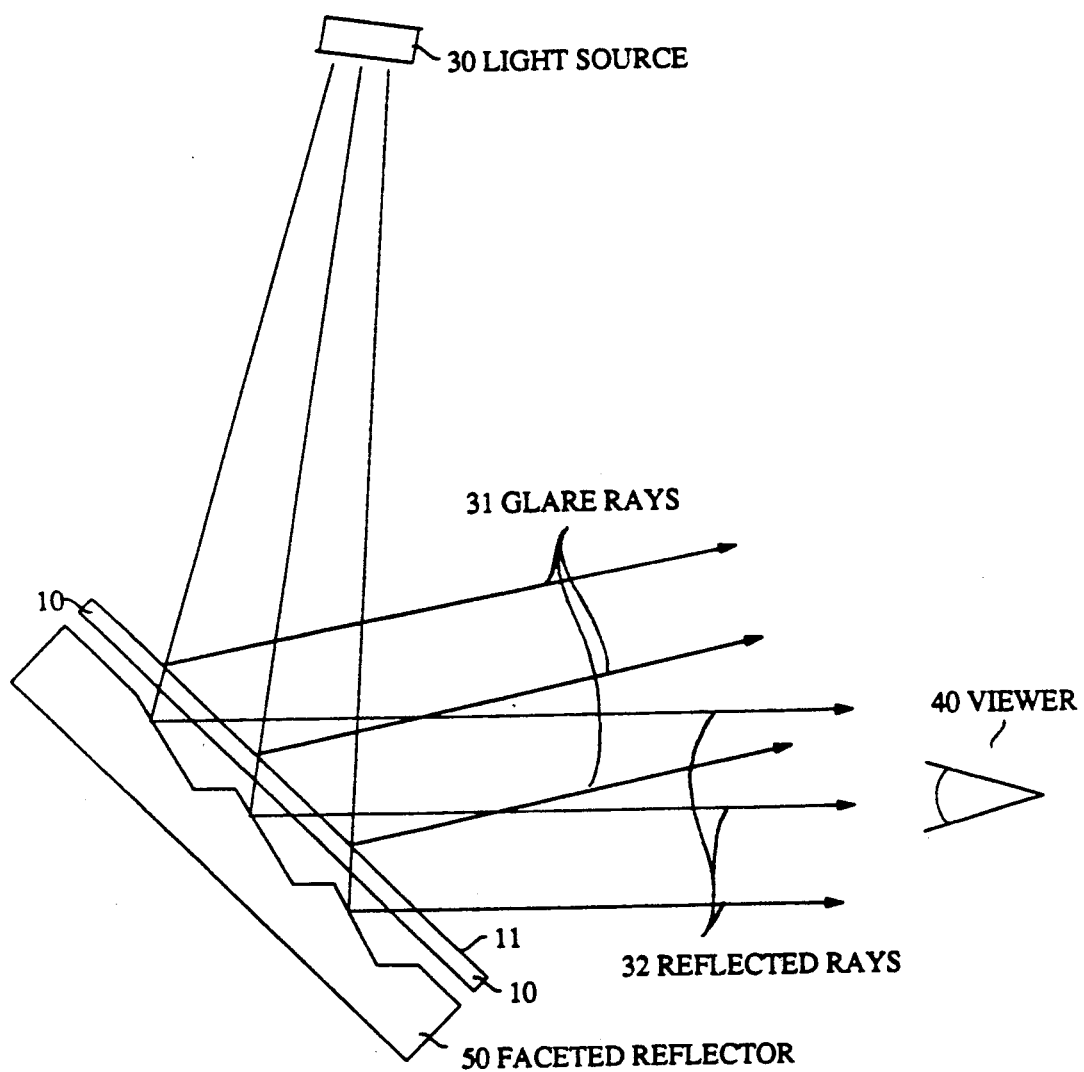
FIG. 2 is a schematic diagram of a transparent display having a multifaceted back reflector in accordance with the invention.

FIG. 2 schematically illustrates applicant's solution to the problem of increasing contrast while reducing glare in a transparent display. FIG. 2 is similar to FIG. 1 except planar back reflector 20 has been replaced with a multifaceted back reflector 50, having a plurality of reflecting facets angularly displaced with respect to the plane of front cell surface 11. As a consequence of this displacement, reflected rays 32 from reflector 50 are angularly displaced as compared with glare rays 31 from surface 11. Thus at appropriate viewing angle, a viewer 40 can see the contrast enhancing reflected light 32 with a reduced level of glare 31. In addition, a faceted reflector of appropriate dimensions has the additional advantage that it tends to break up shadows from dark pixels.

In its more general form, the invention is a transparent display device comprising a transparent display cell having front and back sides and a multifaceted back reflector disposed adjacent the back side of the cell. The back reflector comprises at least three repeated reflecting facets angularly displaced with respect to the front side of the cell by respectively different angles. At least three facet angles are needed to insure concentration of light in multiple reflection lobes, and the reflecting facets, while they can be randomly distributed, are preferably repeated in an array having a period of 1 to 50 mils in order to simulate continuous back lighting and to break up pixel shadows. Preferably the facet angles are chosen to anticipate likely viewing angles and the probable location of light sources.

Figure 3:
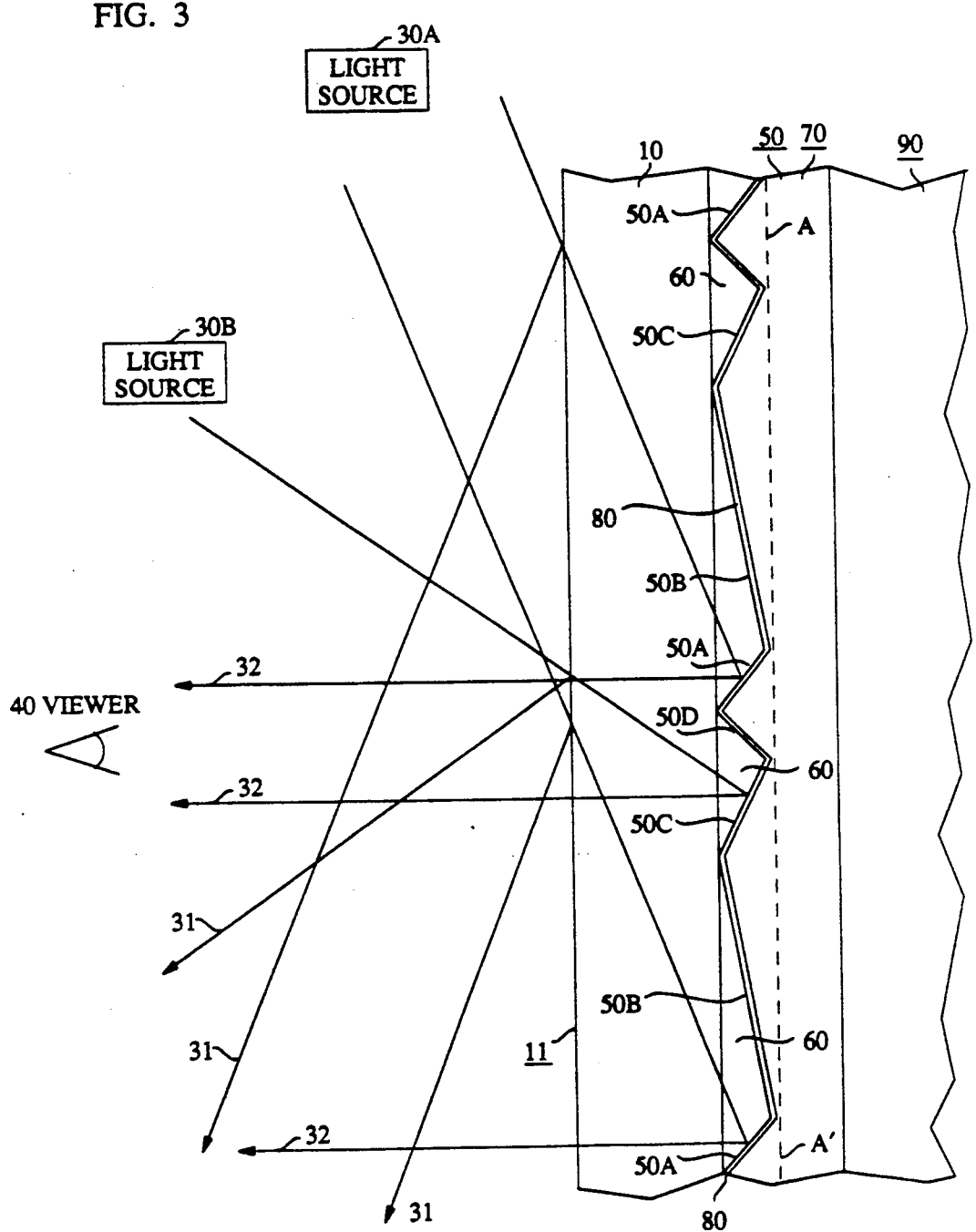
FIG. 3 is a schematic cross section of a transparent display having a preferred configuration back reflector for vertical mounting.

FIG. 3 is a schematic cross section of a transparent display having a multifaceted back reflector configured for substantially vertical mounting. The display is particularly useful as the display screen for a portable computer. Specifically, the display comprises a transparent display cell 10, such as an LCD cell, having a multifaceted back reflector 50 especially designed for viewing when the display is oriented in a vertical position. The reflector 50 has a periodic repetition of plural facets (here four) 50A, 50B, 50C, and 50D, oriented to reflect to a viewer, light from a source 30A above the viewer and light from a source 30B behind the viewer in a normal position for reading. In this particular embodiment, the preferred facet angles, measured by counterclockwise rotation with respect to a line A-A' parallel to surface 11, are as follows: facet 50A is oriented at an angle of 140°, facet 50B is oriented at 10°, facet 50C, 157.5° and facet 50D, 45°. These angles can be varied within a range of ±5° and produce a similar visual effect. The array of facets in this embodiment preferably have a period of repetition of about 10 mils.

Reflector 50 is bonded to cell 10 by transparent cement 60, such as transparent silicone rubber cement. When the cell is in the vertical position, as on a computer 90, periodic facets 50A will reflect overhead light 30A substantially horizontally and periodic facets 50C will reflect reading light 30B substantially horizontally. The results can be a portable computer with substantially reduced power requirements.

Reflector 50 preferably comprises a body 70 of plastic material, such as polymethyl methacrylate (PMM) coated with reflecting material 80, such as a gold colored material. The periodic structure of facets can be molded or embossed onto thermoplastics such as PMM or molded onto thermosetting plastics such as epoxy resin. Preferably the mold, in addition to providing the periodic structure, is also treated to provide a minor degree of matt finish in order to produce diffusion on the order of 10% to 20% Lambertion. This minor degree of matt finish prevents the reflection of a sharp image of light sources 30A or 30B to the viewer. After molding or embossing, the plastic is coated with the reflecting material, as by plating with gold, in accordance with techniques well known in the art.

Figure 4:
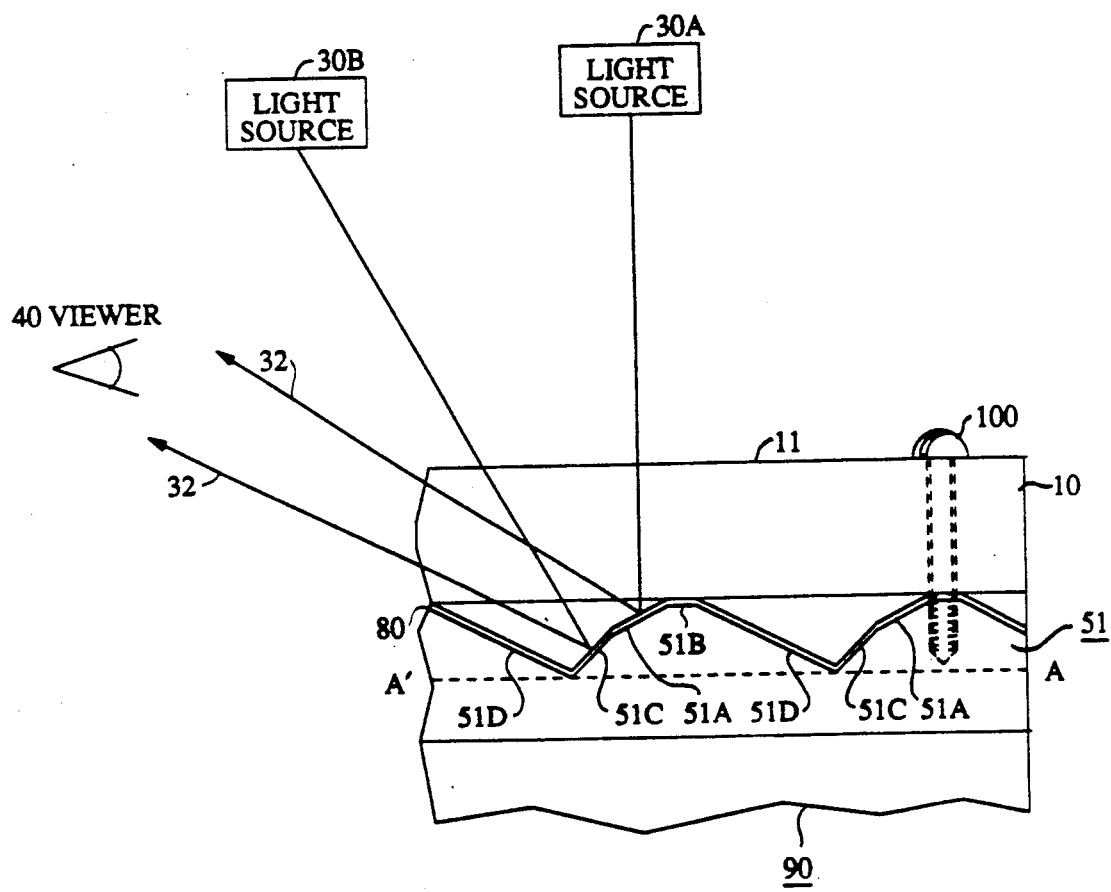
FIG. 4 is a schematic cross section of a transparent display having a preferred configuration back reflector for horizontal mounting.

FIG. 4 is a schematic cross section of a transparent display having a preferred configuration back reflector for a substantially horizontal mounting. The display is particularly useful as the display screen for a portable telephone. Specifically, the display comprises a transparent display cell 10 having a multifaceted back reflector 51 especially designed for viewing when the display is oriented in a horizontal position. The reflector 51 has a periodic repetition of four facets 51A, 51B, 51C, and 51D, oriented to reflect to a viewer light above the viewer and light behind the viewer in a normal position for reading. Measuring the angles by clockwise rotation with respect to a line A-A' parallel to surface 11 drawn through their vertices, facet 51A is oriented at an angle of 200°, facet 51B is oriented at 0°, 51C at 225° and 51D, 140°. These angles can be varied within ±5° and produce substantially the same visual effect.

Reflector 51 can be bonded to cell 10 by transparent cement. When the cell is in the horizontal position, as on a telephone 90, periodic facets 51A will reflect overhead light at an angle of about 45° and facets 51C will reflect light over the viewer's shoulder at about 45°.

Advantageously means, in the form of a plurality of threaded screws 100, are provided for fine adjustment of the facet angles. Tightening the screws pulls the plastic reflector against the back surface of cell 10, tending to flatten the faceted structure. In this case the bonding cement would be omitted. In this way a user can adjust the structure to provide optimal contrast at a desired viewing angle. Clearly this adjustment mechanism could be used with other back reflector configurations such as, for example, the configuration of FIG. 3.

Preferred apparatus for making a multifaceted back reflector in accordance with the invention comprises a pair of metal calender rolls. One of the rolls has a textured surface patterned to the inverse of the periodic structure to be imprinted on the back reflector. By pressure between the rolls or a combination of heat and pressure, a sheet passing between the rolls has one surface imprinted with the desired periodic facet structure.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

I claim:

1. A transparent display device comprising:
    a transparent LCD display cell having front and back sides,
    a multifaceted back reflector disposed adjacent the back side of said cell, said back reflector comprising at least three repeated reflecting facets angularly displaced with respect to the front side of said cell, said reflecting facets oriented to concentrate reflected light in a preselected direction and repeated in a periodic array having a period of repetition in the range from 1 to 50 mils.

2. A display device according to claim 1 wherein the front side of said transparent display cell is planar and said periodic array comprises reflecting facets oriented so that when display is in a vertical position, said array will reflect light above and behind a viewer in a substantially horizontal direction.

3. A display device according to claim 1 wherein the front side of said transparent display cell is planar and said periodic array comprises reflecting facets oriented so that when display is in a horizontal position, said array will reflect light above and behind a viewer at an angle of 45°±10°.

4. A transparent display device comprising:
    a transparent display cell having a back side and a planar front side and a multifaceted back reflector disposed adjacent the back side of said cell, said back reflector comprising a repeated array of four reflecting facets oriented at respective angles with respect to said front side, of 104°±5°, 10°±5°, 157°±5° and 45°±5°.

5. A transparent display device comprising:
a transparent display cell having a back side and a planar front side, and
a multifaceted back reflector disposed adjacent the back side of said cell, said back reflector comprising a repeated array of four reflecting facets oriented at respective angles with respect to said front side of 200°±5°, 0°±5°, 225°±5° and 140°±5°.

6. A display device according to claims 1 or 2 or 3 or 4 or 5 wherein said reflecting facets are textured to provide diffusion of 10% to 20% Lambertion.

7. A display device according to claims 1 or 2 or 3 or 4 or 5 wherein said reflecting facets comprise gold-colored reflecting layers.

8. A computer comprising a display device according to claims 1 or 2 or 3 or 4 or 5.

9. A telephone comprising a display device according to claims 1 or 2 or 3 or 4 or 5.

10. A display device according to claims 1 or 2 or 3 or 4 or 5 further comprising means for adjusting the angles of said facets.

* * * * *